(12) United States Patent
Odate (10) Patent No.: US 10,053,066 B2
(45) Date of Patent: Aug. 21, 2018

(54) VEHICLE BRAKE SYSTEM

(71) Applicant: HONDA MOTOR CO., LTD., Tokyo (JP)

(72) Inventor: Shotaro Odate, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/189,171

(22) Filed: Jun. 22, 2016

(65) Prior Publication Data
US 2016/0368465 A1 Dec. 22, 2016

(30) Foreign Application Priority Data

Jun. 22, 2015 (JP) ................................ 2015-124447

(51) Int. Cl.
| | | |
|---|---|---|
| *B60T 7/22* | (2006.01) | |
| *B60T 8/17* | (2006.01) | |
| *B60T 13/66* | (2006.01) | |
| *B60T 8/1755* | (2006.01) | |
| *B60T 8/40* | (2006.01) | |

(52) U.S. Cl.
CPC ............... *B60T 7/22* (2013.01); *B60T 8/17* (2013.01); *B60T 8/17558* (2013.01); *B60T 13/66* (2013.01); *B60T 8/4081* (2013.01)

(58) Field of Classification Search
CPC ... B60T 1/10; B60T 7/042; B60T 7/22; B60T 8/17; B60T 8/34; B60T 8/441; B60T 8/4077; B60T 8/4081; B60T 13/66; B60T 13/146; B60T 13/586; B60T 13/662; B60T 13/686; B60T 15/16; B60T 2201/024

USPC ........ 303/14, 138, 191, 193; 701/45–46, 70, 701/301; 180/274, 275
See application file for complete search history.

(56) References Cited

U.S. PATENT DOCUMENTS

| | | | | |
|---|---|---|---|---|
| 2005/0200199 A1* | 9/2005 | Kamiya | ................... | B60T 7/065 303/191 |
| 2010/0300794 A1* | 12/2010 | Stabrey | ................... | B60T 7/22 180/275 |
| 2011/0264347 A1* | 10/2011 | Cetinkaya | ................. | B60T 7/22 701/70 |

(Continued)

FOREIGN PATENT DOCUMENTS

| | | | | |
|---|---|---|---|---|
| JP | 2009-166735 A | 7/2009 | | |
| JP | WO 2012157050 A1 * | 11/2012 | ................ | B60T 7/12 |
| WO | WO-2012157050 A1 * | 11/2012 | ................ | B60T 7/12 |

*Primary Examiner* — Robert A. Siconolfi
*Assistant Examiner* — San M Aung
(74) *Attorney, Agent, or Firm* — Westerman, Hattori, Daniels & Adrian, LLP (57) ABSTRACT

A vehicle brake system includes a collision determination unit configured to determine whether collision of the vehicle occurs; a second braking control unit configured to cause at least one of ESB and VSA systems to perform emergency braking control of the vehicle irrespective of a press-down operation of a brake pedal by a driver when collision of the vehicle occurs; and a braking force determination unit configured to determine whether a demanded braking force by emergency braking control exceeds a predetermined braking force threshold. In a case where the collision of the vehicle occurs, and where the demanded braking force exceeds the braking force threshold, the second braking control unit retreats an operation position of the brake pedal in a press-down direction.

11 Claims, 5 Drawing Sheets

(56) References Cited

U.S. PATENT DOCUMENTS

| | | | |
|---|---|---|---|
| 2011/0264348 A1* | 10/2011 | Cetinkaya | B60T 7/22 |
| | | | 701/70 |
| 2012/0112525 A1* | 5/2012 | Shimada | B60T 7/042 |
| | | | 303/10 |
| 2015/0001919 A1* | 1/2015 | Murayama | B60T 8/441 |
| | | | 303/14 |
| 2016/0185328 A1* | 6/2016 | Hattori | B60T 8/17558 |
| | | | 701/70 |

* cited by examiner

VEHICLE BRAKE SYSTEM

CROSS REFERENCES TO RELATED APPLICATIONS

The present application claims priority under 35 U.S.C. § 119 to Japanese Patent Application No. 2015-124447, filed Jun. 22, 2015, entitled "Vehicle Brake System." The contents of this application are incorporated herein by reference in their entirety.

TECHNICAL FIELD

The present disclosure relates to a vehicle brake system for braking a vehicle.

BACKGROUND

Japanese Unexamined Patent Application Publication No. 2009-166735 (hereinafter JP2009-166735) discloses an example of the brake system for braking the vehicle. The brake system according to JP2009-166735 includes a brake pedal configured to be pressed down in a press-down operation by a driver; a master cylinder configured to operate and apply fluid pressure to a fluid pressure circuit based on an operation force applied to the brake pedal; a rod configured to operate together with the master cylinder; a lock cylinder including a fluid reservoir for reserving a fluid inside, the lock cylinder connected to the rod and configured to transmit the operation force applied to the brake pedal to the rod; and a fluid circulation mechanism capable of discharging the fluid from the fluid reservoir based on a detection result of a collision detection sensor configured to detect collision of the vehicle.

The brake system according to JP2009-166735 has a simple configuration capable of reducing a collision impact that the brake pedal gives to the driver when collision of the vehicle concerned occurs, in a prompt and reliable manner.

SUMMARY

However, the brake system according to JP2009-166735 has a problem that a driver is given an uncomfortable feeling involved in a press-down operation after collision of the vehicle.

In view of the foregoing problems, the present disclosure describes, for example, a vehicle brake system capable of reducing an collision impact that a brake pedal gives to a driver when a vehicle concerned encounters a collision accident, without giving an uncomfortable feeling involved in a press-down operation by the driver.

For achieving the above, a first aspect of the present disclosure provides a vehicle brake system for braking a vehicle, the vehicle brake system including a brake pedal configured to be pressed down in a press-down operation by a driver in braking the vehicle; a brake fluid pressure generator configured to generate brake fluid pressure in response to a brake demand including the press-down operation; a demanded braking force acquisition unit configured to acquire a demanded braking force based on the press-down operation; a collision determination unit configured to determine whether collision of the vehicle occurs or not; a braking control unit configured to, when the collision determination unit determines that collision of the vehicle occurs, cause the brake fluid pressure generator to perform emergency braking control of the vehicle based on an emergency braking demand irrespective of the press-down operation by the driver; and a braking force determination unit configured to determine whether a demanded braking force acquired by the demanded braking force acquisition unit exceeds a predetermined braking force threshold. In a case where the collision determination unit determines that collision of the vehicle occurs and where the braking force determination unit determines that the demanded braking force exceeds the braking force threshold, the braking control unit retreats an operation position of the brake pedal based on the demanded braking force in a press-down direction compared with the operation position of the brake pedal based on a braking force equivalent to the demanded braking force when collision of the vehicle does not occur.

In terms of the first aspect of the present disclosure, in the case where the vehicle encounters a collision accident, and where a press-down operation exceeding the predetermined braking force threshold is performed, a reaction force transmitted to the driver's foot through the brake pedal tends to increase.

In view of this, according to the first aspect of the present disclosure, in the case where the collision determination unit determines that collision of the vehicle occurs, and where the braking force determination unit determines that the demanded braking force based on the press-down operation exceeds the braking force threshold, the braking control unit retreats the operation position of the brake pedal based on the demanded braking force in the press-down direction compared with the operation position of the brake pedal based on the braking force equivalent to the demanded braking force when collision of the vehicle does not occur.

According to the first aspect of the present disclosure, in the case where the vehicle encounters a collision accident, and where a press-down operation exceeding the predetermined braking force threshold is performed, it is possible to reduce a collision impact that the brake pedal gives to the driver, while securing emergency braking force by emergency braking control and without giving an uncomfortable feeling involved in the press-down operation by the driver.

A second aspect of the present disclosure provides a vehicle brake system for braking the vehicle, the vehicle brake system including: a brake pedal configured to be pressed down in a press-down operation by a driver in braking the vehicle; a brake fluid pressure generator configured to generate brake fluid pressure in response to a brake demand including the press-down operation; a demanded braking force acquisition unit configured to acquire a demanded braking force based on the press-down operation; a collision determination unit configured to determine whether collision of the vehicle occurs or not; a braking control unit configured to, when the collision determination unit determines that collision of the vehicle occurs, cause the brake fluid pressure generator to perform emergency braking control of the vehicle based on an emergency braking demand irrespective of the press-down operation by the driver; and a braking force determination unit configured to determine whether a demanded braking force acquired by the demanded braking force acquisition unit exceeds an emergency braking force by the braking control unit. In a case where the collision determination unit determines that collision of the vehicle occurs and where the braking force determination unit determines that the demanded braking force exceeds the emergency braking farce by the braking control unit, the braking control unit retreats an operation position of the brake pedal based on the demanded braking force in a press-down direction compared with the operation position of the brake pedal based on a braking force equivalent to the demanded braking force when collision of the vehicle does not occur.

In terms of the second aspect of the present disclosure, in the case where the vehicle encounters a collision accident, and where a press-down operation exceeding an emergency braking force by the braking control unit is performed, the reaction force transmitted to the driver's foot through the brake pedal tends to increase.

In view of this, according to the second aspect of the present disclosure, in the case where the collision determination unit determines that collision of the vehicle occurs, and where the braking force determination unit determines that a demanded braking force based on the press-down operation exceeds the emergency braking force by the braking control unit, the braking control unit retreats the operation position of the brake pedal based on the demanded braking force in the press-down direction compared with the operation position of the brake pedal based on the braking force equivalent to the demanded braking force when collision of the vehicle does not occur.

According to the second aspect of the present disclosure, in the case, where the vehicle encounters a collision accident, and where the press-down operation exceeding the emergency braking force by the braking control unit is performed, it is possible to reduce a collision impact that the brake pedal gives to the driver while securing the emergency braking force by emergency braking control and without giving an uncomfortable feeling involved in the press-down operation by the driver.

A third aspect of the present disclosure provides the vehicle brake system of the first or second aspect, in which the brake fluid pressure generator includes: a first-brake fluid pressure generator including a first actuator configured to be driven depending on the press-down operation, the first brake fluid pressure generator configured to generate brake fluid pressure by driving the first actuator; and a second brake fluid pressure generator including a second actuator configured to be driven depending on brake demand, the second brake fluid pressure generator configured to generate brake fluid pressure by driving the second actuator. When the collision determination unit determines that collision of the vehicle occurs, the braking control unit causes the second brake fluid pressure generator to perform emergency braking control of the vehicle based on an emergency braking demand and thereby retreat an operation position of the brake pedal in the press-down direction.

As to the third aspect of the present disclosure, in general, the second brake fluid pressure generator has better follow-up performance of the brake fluid pressure with respect to a target brake fluid pressure than the first brake fluid pressure generator.

Thus, according to the third aspect of the present disclosure, in the case where the collision determination unit determines that collision of the vehicle occurs, the braking control unit causes the second brake fluid pressure generator to perform the emergency braking control of the vehicle based on the emergency braking demand and thereby retreat the operation position of the brake pedal in the press-down direction.

According to the third aspect of the present disclosure, it is possible to reduce a collision impact that the brake pedal gives to the driver while securing an emergency braking force by emergency braking control having better follow-up performance of the brake fluid pressure with respect to the target brake fluid pressure than in the first or second aspect and without giving an uncomfortable feeling involved in the press-down operation by the driver.

A fourth aspect of the present disclosure provides the vehicle brake system of the third aspect, the vehicle brake system further including: a master cylinder configured to generate brake fluid pressure based on the press-down operation by the driver; a master cut valve provided inside a first, fluid path communicating and coupling the master cylinder and the first, brake fluid pressure generator with each other, the master cut valve configured to release or block the first fluid path; a stroke simulator communicated and coupled with the master cylinder and configured to produce a reaction force against the press-down operation of the brake pedal by the driver; and a stroke simulator valve provided inside a second fluid path communicating and coupling the master cylinder and the stroke simulator with each other, the stroke simulator valve configured to release or block the second fluid path. When the collision determination unit determines that collision of the vehicle occurs, the braking control unit releases the master cut valve and the stroke simulator valve and thereby retreats the operation position of the brake pedal in the press-down direction.

The problem is how the brake fluid pressure generated in the master cylinder is released to members communicating with the master cylinder when the operation position of the brake pedal is retreated in the press-down direction.

Thus, according to the fourth aspect of the present disclosure, in the case where the collision determination unit determines that collision of the vehicle occurs, the braking control unit releases the master cut valve and the stroke simulator valve, and thereby retreats the operation position of the brake pedal in the press-down direction.

The fourth aspect of the present disclosure may produce an effect in which the operation position of the brake pedal is retreated in the press-down direction more quickly and greatly than in the third aspect of the present disclosure.

The vehicle brake system according to the present disclosure, for example, reduces a collision impact that the brake pedal gives to the driver when a vehicle concerned encounters a collision accident, while securing the emergency braking force by emergency braking control and without giving an uncomfortable feeling involved in the press-down operation by the driver.

BRIEF DESCRIPTION OF DRAWINGS

The advantages of the disclosure will become apparent in the following description taken in conjunction with the following drawings.

DETAILED DESCRIPTION

Hereinafter, a vehicle brake system 10 according to the embodiments of the present disclosure is described in detail with reference to the accompanying drawings.

In the drawings referred to hereinafter, members having a common feature or members having a mutually corresponding feature are assigned, in principle, with a common reference numeral. For convenience of description, size and shape of the member may foe schematically represented by deformation or exaggeration.

[Overview of Vehicle Brake System 10 According to Embodiments of Present Disclosure]

A vehicle brake system 10 according to the embodiments of the present disclosure includes a by-wire type brake system configured to generate a braking force via an electric system in addition to an existing brake system configured to generate a braking force via a hydraulic system.

Figure 1A:
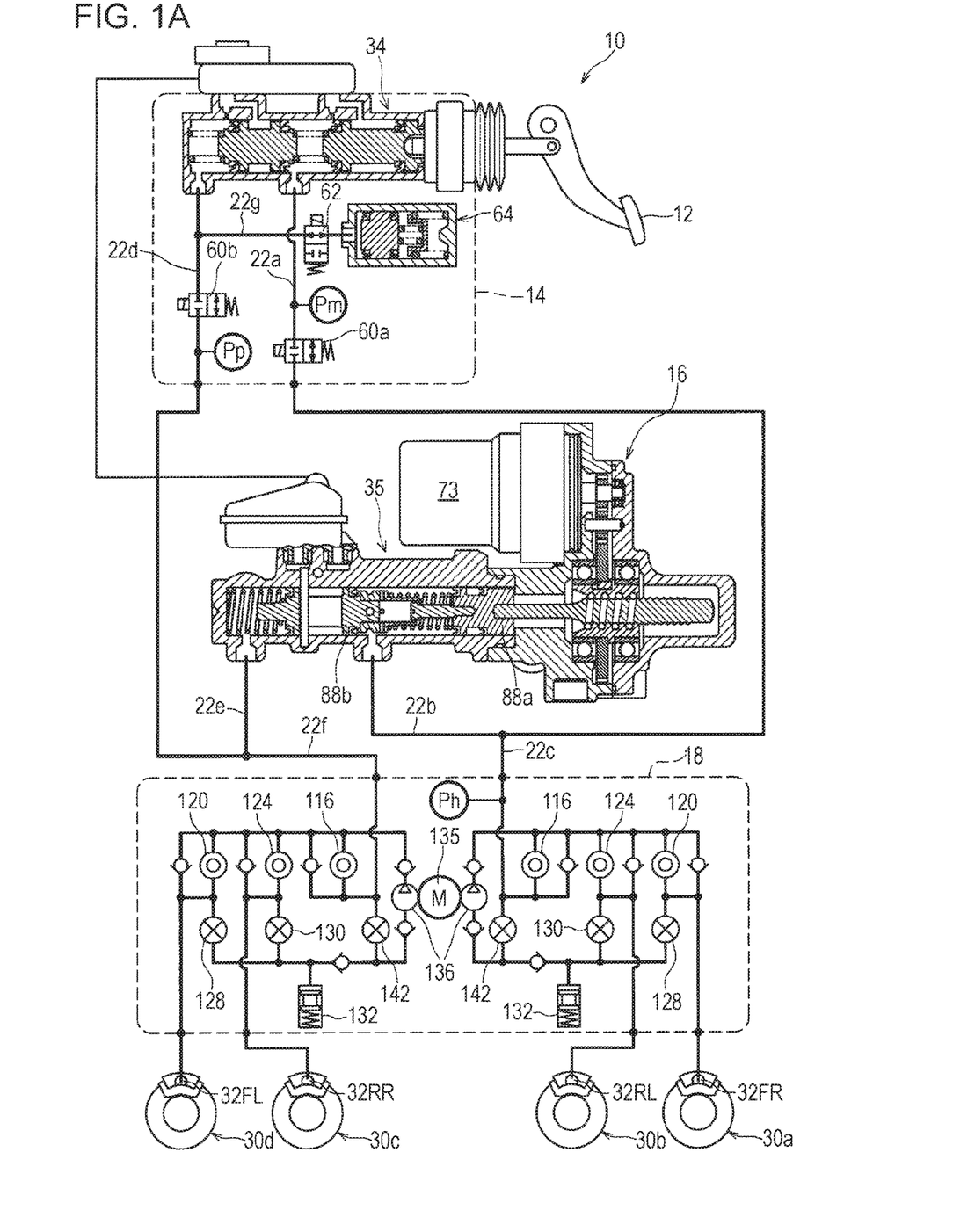
FIG. 1A is a configuration diagram representing an overview of a vehicle brake system (in a normal state without occurrence of collision) according to an embodiment of the present disclosure.
Figure 1B:
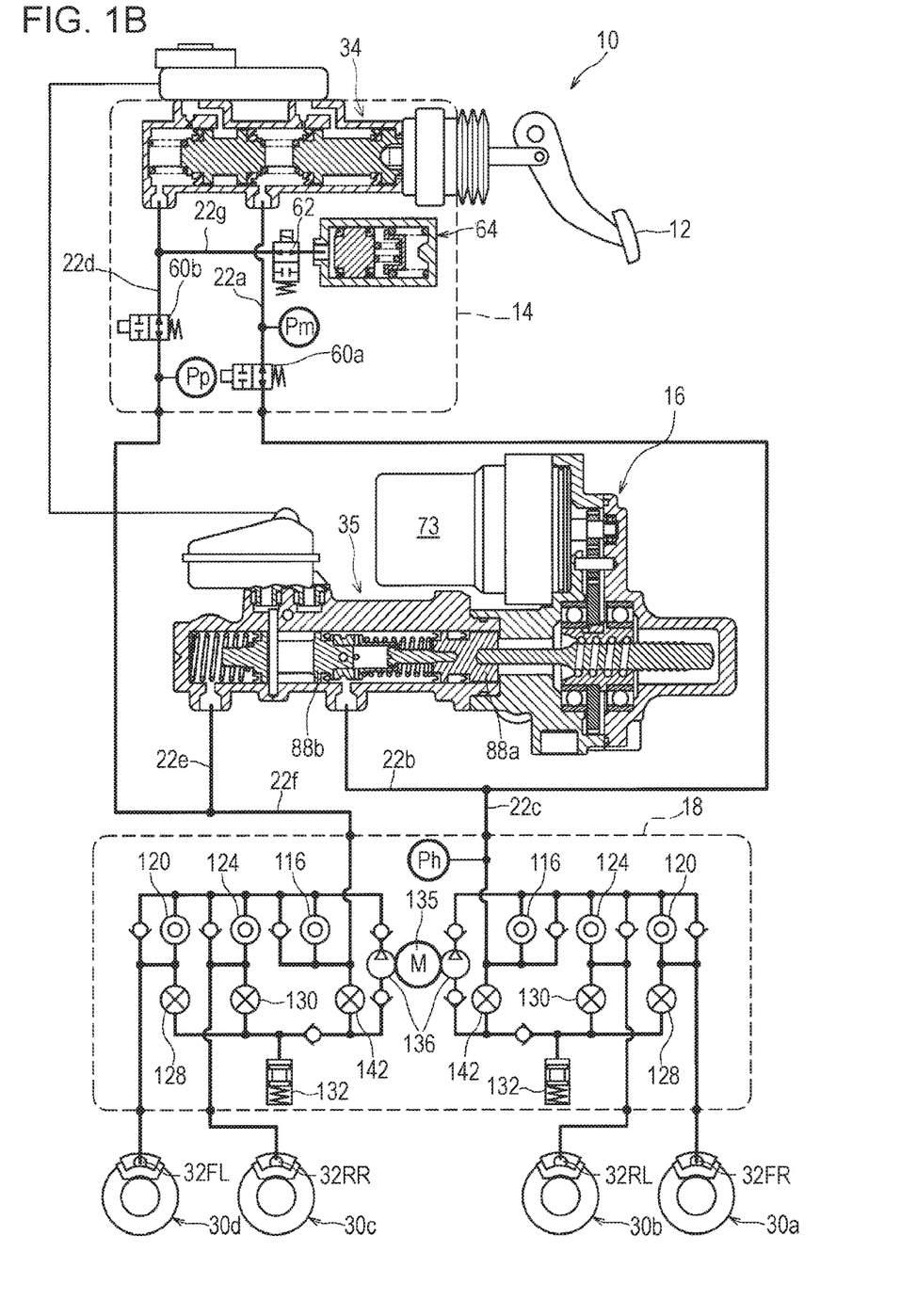
FIG. 1B is a configuration diagram representing an overview of a vehicle brake system (in an abnormal state with occurrence of collision) according to the embodiment of the present disclosure.

As illustrated in FIGS. 1A and 1B, the vehicle brake system 10 includes a pseudo brake fluid pressure generator 14, an electric servo brake system (ESB system) 16 and a vehicle stability assist system (VSA system) 18 and so on. The pseudo brake fluid pressure generator 14, ESB system 16 and VSA system 18 are coupled with each other by mutually communicating via piping tubes 22a to 22f that circulate a brake fluid, as illustrated in FIGS. 1A and 1B.

The pseudo brake fluid pressure generator 14 is configured to convert a brake tread force inputted by a driver via a brake pedal 12 into pseudo brake fluid pressure. As illustrated in FIGS. 1A and 1B, the pseudo brake fluid pressure generator 14 includes a master cylinder 34, normally-open first and second master cut valves 60a, 60b, a pair of brake fluid pressure sensors Pm, Pp, and a stroke simulator 64.

The master cylinder 34 generates pseudo brake fluid pressure in response to operation of the brake pedal 12 by converting a brake tread force of the driver inputted via the brake pedal 12 into the pseudo brake fluid pressure.

The first and second master cut valves 60a, 60b are provided respectively inside the piping tubes (first fluid path) 22a, 22b communicating and coupling the master cylinder 34 and ESB system 16 with each other. When the vehicle brake system 10 is in the normal operation mode, first and second master cut valves 60a, 60b are subjected to excitation control (with piping tubes (first fluid path) 22a, 22b blocked) as illustrated in FIG. 1A. Thus, communication between the master cylinder 34 and disc brake mechanisms 30a to 30d (including wheel cylinders 32FR, 32RL, 32RR, 32FL) for braking four wheels are blocked and thereby the disc brake mechanisms 30a to 30d are operated by using a brake fluid pressure generated by the ESB system 16.

When a vehicle concerned encounters a collision accident, first and second master cut valves 60a, 60b are subjected to demagnetization control (to release the piping tubes (first fluid path) 22a, 22d) as illustrated in FIG. 1B. Thus, brake fluid pressure generated in the master cylinder 34 is released toward the ESB system 16, and thereby the brake pedal 12 is retreated in the press-down direction. This acts to reduce an impact which the brake pedal 12 gives to the driver.

In the description below, when collectively referred to, wheel cylinders 32FR, 32RL, 32RR, and 32FL are referred to as wheel cylinder 32.

A pair of brake fluid pressure sensors Pro, Pp are provided respectively so as to interpolate in piping tubes (first fluid path) 22a, 22b communicating and coupling the master cylinder 34 and ESB system 16 with each other. The brake fluid pressure sensor Pro has a feature of detecting pseudo brake fluid pressure generated in the master cylinder 34. The brake fluid pressure sensor Pp has a feature of detecting brake fluid pressure on the downstream side of the second master cut valve 60b.

The stroke simulator 64 is communicated with and coupled to the master cylinder 34 via a branch pipeline (second fluid path) 22g branched from the piping tube 22d. The branch pipeline (second fluid path) 22g is provided with an normally-closed stroke simulator valve 62 configured to open or close the branch pipeline (second fluid path) 22g. When the vehicle brake system 10 is in the normal operation mode, the stroke simulator valve 62 is subjected to excitation control (with branch pipeline (second fluid path) 22g released) as illustrated in FIG. 1A. Thus, the stroke simulator 64 elastically absorbs pseudo brake fluid pressure generated in the master cylinder 34 when the branch pipeline (second fluid path) 22g is released, and thereby acts to build up a pseudo reaction force in response to a press-down operation of the brake pedal 12 by a driver.

The stroke simulator valve 62 is subjected to excitation control (with branch pipeline (second fluid path) 22g released) as illustrated in FIG. 1B even when the vehicle concerned encounters a collision accident. Thus, the stroke simulator 64 elastically absorbs pseudo braking liquid pressure generated in the master cylinder 34 when the branch pipeline (second fluid path) 22g is opened, and thereby retreats the brake pedal 12 in the press-down direction and acts to reduce a collision impact that the brake pedal 12 gives to the driver.

The ESB system 16 has a feature of generating brake fluid pressure according to a pseudo brake fluid pressure generated in the master cylinder 34 or independently from the brake fluid pressure generated in the master cylinder 34. As illustrated in FIGS. 1A and 1B, the ESB system 16 includes a brake motor (first actuator) 73, first and second slave pistons 88a, 88b and so on. First and second slave pistons 88a, 88b are configured to receive a rotation drive force of the brake motor 73 and act to generate brake fluid pressure. The ESB system 16 corresponds to a "first brake fluid pressure generator" according to the present disclosure.

The VSA system 18 has an ABS feature of preventing a wheel from being locked during brake operation; a traction control system (TCS) feature of preventing a wheel from slippage, for example, during acceleration; a feature of suppressing, for example, lateral slide when turning; and a feature of performing emergency braking control based on an emergency brake demand independently from a brake operation by the driver when collision of the vehicle (not illustrated) occurs (it will be described in detail later). To implement those features, the VSA system 18 regulates brake fluid pressure generated in the ESB system 16 and thereby assists vehicle stability. The VSA system 18 corresponds to a "second brake fluid pressure generator" according to the present disclosure.

To foe more specific, the VSA system 18 includes a brake fluid pressure sensor Ph configured to detect brake fluid pressure generated in a slave cylinder 35 of the ESB system 16, a pressure pump 136 for pressurizing a brake fluid, a pump motor (second actuator) 135 for driving the pressure pump 136, a regulator valve 116, a first in-valve 120, a second in-valve 124, a first out-valve 128, a second out-valve 130, a reservoir 132, a suction valve 142, and so on.

The VSA system 18 may have a configuration including the ABS feature only.

The following procedure may foe adopted to regulate a VSA brake, fluid pressure by operation of the VSA system 18. First, when the normally-closed suction valve 142 provided in a fluid supply path of the VSA system 18 is energized to open, the VSA system 18 drives the pressure pump 136 using the pump motor 135, Then, the brake fluid suctioned via the suction valve 142 and pressurized by the pressure pump 136 is supplied to the regulator valve 116, first in-valve 120 and second in-valve 124 respectively.

The VSA system 18 energizes the regulator valve 116 to regulate the opening thereof and thereby regulates the VSA brake fluid pressure to a target fluid pressure and supplies a brake fluid of a pressure regulated to the target fluid pressure to wheel cylinders 32FR, 32RL, 32RR, and 32FL respectively via opened first in-valve 120 and second in-valve 124. Thus, the VSA system 18 controls a braking force of four wheels to a braking force corresponding to a target fluid pressure for each wheel even when a driver does not operate the brake pedal 12.

For example, assume that a right front wheel (FR) falls into a lock tendency during braking. In such a case, the following procedure may be adopted to regulate a VSA brake fluid pressure for the right front wheel (FR) by operation of the VSA system 18.

That is, the VSA system 18 first energizes the normally-open first in-valve 120 provided in a fluid pressure path, for the right front wheel (FR) to open and also energizes the normally-open first out-valve 128 to open. Thus, the VSA system 18 reduces the brake fluid pressure applied to the wheel cylinder 32FR of the right front wheel (FR) to a predetermined pressure by releasing to the reservoir 132. Then, the VSA system 18 de-energizes the first out-valve 128 to close. Thus, the brake fluid pressure applied to the wheel cylinder 32FR of the right, front, wheel (FR) is maintained.

As a result, as lock tendency of the right front, wheel (FR) is canceled, the first in-valve 120 is de-energized to open, and the first out-valve 128 is de-energized to close. Thus, the brake fluid pressure (pressurized by the pressure pump 136 as necessary) from the ESB system 16 located on the upstream side of the VSA system 18 is increased to a predetermined pressure by acting on the wheel cylinder 32FR of the right front, wheel (FR).

When the right, front wheel (FR) falls into a lock tendency again due to the pressure increase, the above procedure of pressure reduction, holding, and pressure increase is repeated in this order. Thus, the VSA system 18 may perform ABS control of reducing the braking distance while preventing the right front wheel (FR) from falling into a lock state.

Although the above ABS control is described by using an example where the right front wheel (FR) falls into a lock tendency, the VSA system 18 may perform ABS control by using a similar procedure as above even when a wheel other than the right front wheel (FR) falls into a lock tendency.

Other elements of FIGS. 1A and 1B are not directly related to the present disclosure. Therefore, description thereof is omitted.

[Basic Operation of Vehicle Brake System 10]

Next, basic operation of the vehicle brake system 10 is described.

In the vehicle brake system 10, a so-called by-wire brake system becomes active when a driver presses down the brake pedal 12 during normal operation of a below described ESB-ECU 29 (see FIG. 2) which controls the ESB system 16.

Specifically, in the normally operating vehicle brake system 10, when a driver presses down the brake pedal 12, first and second master cut valves 60a, 60b are closed as illustrated in FIG. 1A, and with the stroke simulator valve 62 in a released state, disk brake mechanisms 30a to 30d operate with brake fluid pressure generated by the ESB system 16.

Then, the brake fluid flows into the stroke simulator 64 via the stroke simulator valve 62 from the master cylinder 34. Thus, even when first and second master cut valves 60a, 60b are blocked, flow of the brake fluid from the master cylinder 34 to the stroke simulator 64 occurs, and this causes a stroke to the brake pedal 12.

Meanwhile, in the vehicle brake system 10, for example, if a driver presses down the brake pedal 12 when the ESB system 16 falls into an abnormal state, an existing hydraulic brake system becomes active. Specifically, in the vehicle brake system 10 in an abnormal state, when a driver presses down the brake pedal 12, first and second master cut valves 60a, 60b are opened respectively and the stroke simulator valve 62 is closed, and brake fluid pressure generated in the master cylinder 34 is transmitted to the wheel cylinders 32FR, 32RL, 32RR, 32FL of the disk brake mechanisms 30a to 30d to activate the disk brake mechanisms 30a to 30d.

[Peripheral Configuration of ESB-ECU 29 and VSA-ECU 31 of Vehicle Brake System 10]

Figure 2:
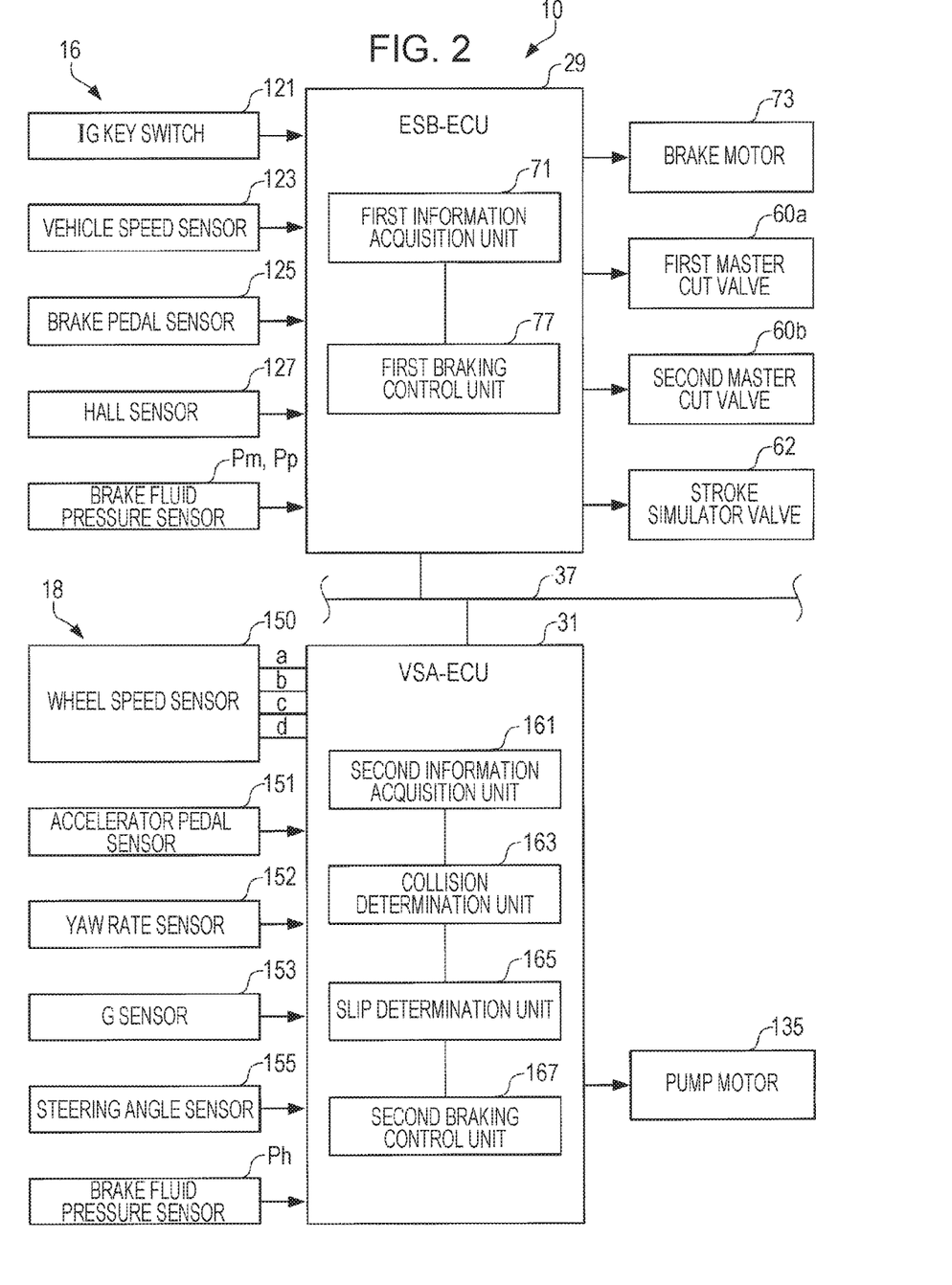
FIG. 2 is a block diagram representing a peripheral configuration of an ESB-ECU and a VSA-ECU of the vehicle brake system.

Next, peripheral configuration of the ESB-ECU 29 and VSA-ECU 31 of the vehicle brake system 10 according to the embodiment of the present disclosure is described with reference to FIG. 2. FIG. 2 is an illustrative diagram representing a peripheral configuration of the ESB-ECU 29 and VSA-ECU 31 of the vehicle brake system 10.

The ESB-ECU 29 and VSA-ECU 31 are coupled with each other in a manner allowing mutual information communication, for example, via a CAN communication medium. 37 as illustrated in FIG. 2.

The CAN communication medium 37 is a multiplexed serial communication network widely used for information communication among vehicle-mounted devices. The CAN communication medium 37 has an excellent data transfer rate and error detection capacity. However, the "information communication medium" used in the embodiment of the present disclosure is not limited to the CAN communication medium 37. For example, FlexRay (trade mark) may be adopted as the "information communication medium" used in the embodiment of the present disclosure.

[Configuration of ESB-ECU 29]

As illustrated in FIG. 2, the ESB-ECU 29 is coupled with an ignition key switch (hereinafter abbreviated as "IG key switch") 121, a vehicle speed sensor 123, a brake pedal sensor 125, a hail sensor 127 and brake fluid pressure sensors Pm, Pp respectively, as an input system.

The IG key switch 121 is a switch operated when supplying power to parts of electrical components mounted on a vehicle via a vehicle-mounted battery (not shown). When the IG key switch 121 is turned on, power is supplied to the ESB-ECU 29 and VSA-ECU 31, and the ESB-ECU 29 and VSA-ECU 31 are activated.

The vehicle speed sensor 123 has a feature of detecting the traveling speed (vehicle speed) V of the vehicle. Information on the vehicle speed V detected by the vehicle speed sensor 123 is sent to the ESB-ECU 29.

The brake pedal sensor 125 has a feature of detecting the operation amount (stroke amount) and torque of the brake pedal 12 by a driver. Information on the operation amount and torque of the brake pedal 12 detected by the brake pedal sensor 125 is sent to the ESB-ECU 29.

The hall sensor 127 has a feature of detecting the rotation angle (current location information in the axial direction of slave pistons 88a, 88b) of the brake motor 73. Information on the rotation angle of the brake motor 73 detected by the hall sensor 127 is sent to the ESB-ECU 29.

The brake fluid pressure sensors Pm, Pp have a feature of detecting an upstream fluid pressure of the first master cut valve 60a and a downstream fluid pressure of the second master cut valve 60b in a brake fluid pressure system respectively. Fluid pressure information of components of the brake fluid pressure system detected by brake fluid pressure sensors Pm, Pp is sent to the ESB-ECU 29.

Meanwhile, as illustrated in FIG. 2, the ESB-ECU 29 is coupled with the brake motor 73, first and second master cut valves 60a, 60b and the stroke simulator valve 62 respectively as an output system.

As illustrated in FIG. 2, the ESB-ECO 29 includes a first information acquisition unit 71 and a first braking control unit 77.

The first information acquisition unit 71 has a feature of acquiring information on the on/off operation of the IG key switch 121, information on the vehicle speed V detected by the vehicle speed sensor 123, information on the operation amount and braking torque of the brake pedal 12 detected by the brake pedal sensor 125, information of the rotation angle of the brake motor 73 detected by the hall sensor 127, and information on brake fluid pressure of components detected by brake fluid pressure sensors Pm, Pp. Note that the operation amount detected by the brake pedal sensor 125 corresponds to a "demanded braking force" according to the present disclosure.

Also, the first information acquisition unit 71 has a feature of acquiring collision information as to whether collision of the vehicle occurs and fluid pressure information detected by the brake fluid pressure sensor Ph, sent from the VSA-ECU 31 via the CAN communication medium 37.

A first braking control unit 77 basically has a feature of controlling brake fluid pressure applied to the wheel cylinder 32 based on information on the brake operation acquired by the first information acquisition unit 71 and information on brake fluid pressure of components such that brake fluid pressure generated in the ESB system. 16 follows a target brake fluid pressure corresponding to the brake operation.

The first braking control unit 77 has a feature that, when collision information of the vehicle's collision is received, opens first, and second master cut valves 60a, 60b, allows a flow of the brake fluid between the master cylinder 34 and the slave cylinder 35, opens the stroke simulator valve 62 and allows a flow of the brake fluid between the master cylinder 34 and the stroke simulator 64, and thereby assists the retreat operation of the brake pedal 12 by the VSA system 18.

The ESB-ECU 2S includes a microcomputer including a central processing unit (CPU), a read only memory (ROM), and a random access memory (RAM) and the like. The microcomputer reads out and executes programs and data stored in the ROM, and operates to control execution of various features of the ESB-ECU 29 including various information acquisition features including collision information on whether collision of the vehicle occurs and a control feature of brake fluid pressure to be applied to the wheel cylinder 32, feature assisting the retreat operation of the brake pedal 12 by the VSA system 18.

[Configuration of VSA-ECU 31]

As illustrated in FIG. 2, the VSA-ECO 31 is coupled with a wheel speed sensor 150, an accelerator pedal sensor 151, a yaw rate sensor 152, a G sensor 153, a steering angle sensor 155, and a brake fluid pressure sensor Ph.

Wheel speed sensors 150a to 150d have a feature of respectively detecting the rotation speed (wheel speed) for each wheel. Information on the rotation speed for each wheel respectively detected by wheel speed sensors 150a to 150d is sent to the VSA-ECU 31.

The accelerator pedal sensor 151 has a feature of detecting the operation amount (stroke amount) of the accelerator pedal by a driver. Information on the operation amount of the accelerator pedal detected by the accelerator pedal sensor 151 is sent to the VSA-ECU 31.

The yaw rate sensor 152 has a feature of detecting the yaw rate generated in the vehicle. Information on the yaw rate detected by the yaw rate sensor 152 is sent to the VSA-ECU 31.

The G sensor 153 has a feature of respectively detecting the longitudinal G (longitudinal acceleration) and the lateral G (lateral acceleration) generated in the vehicle. Information on the longitudinal G and lateral G detected by the G sensor 153 is sent to the VSA-ECU 31.

The steering angle sensor 155 has a feature of detecting the steering amount and steering direction of the steering. Information on the steering angle of the steering detected by the steering angle sensor 155 is sent to the VSA-ECU 31.

The brake fluid pressure sensor Ph has a feature of detecting the brake fluid pressure in a fluid supply path of the VSA system 18 in the brake fluid pressure system. Information of fluid pressure in the fluid supply path of the VSA system 18 detected by brake fluid pressure sensors Ph is sent to the ESB-ECU 29.

Meanwhile, as illustrated in FIG. 2, the VSA-ECU 31 is coupled with the pump motor 135 as an output system.

The VSA-ECU 31 includes a second information acquisition unit 161, a collision determination unit 163, a braking force determination unit 165, and a second braking control unit 167.

The second information acquisition unit 161 has a feature of acquiring information on the rotation speed (wheel speed) for each wheel detected respectively by wheel speed sensors 150a to 150d, information on acceleration and deceleration operation amount of the accelerator pedal detected by the accelerator pedal sensor 151, information on the yaw rate generated in a vehicle detected by the yaw rate sensor 152, information on the longitudinal G and the lateral G generated in the vehicle detected by the G sensor 153, information on the steering angle detected by the steering angle sensor 155, and information of fluid pressure in the fluid supply path of the VSA system 18 detected by the brake fluid pressure sensor Ph.

Also, the second information acquisition unit 161 has a feature of acquiring information on the demanded braking force based on an operation amount of the brake pedal 12 sent from the ESB-ECD 29 via the CAN communication medium 37. The second information acquisition unit 161 corresponds to "demanded braking force acquisition unit" of the present disclosure.

The collision determination unit 163 has a feature of determining whether collision of the vehicle occurs, based on information on the longitudinal G and lateral G generated in the vehicle detected by the G sensor 153. The collision determination unit 163 determines that the vehicle has collided when at least both of the longitudinal G and lateral G exceed a collision determination threshold predetermined for each G.

Information of the determination result by the collision determination unit 163 as to whether collision of the vehicle occurs is referred to as appropriate when the second braking control unit 167 determines whether execution of the emergency braking control is necessary or not and whether retreat of the brake pedal 12 is necessary or not.

The braking force determination unit 165 determines whether a demanded braking force Pdm based on the operation amount of the brake pedal 12 acquired by the second information acquisition unit 161 exceeds a predetermined braking force threshold Pth. Here, an emergency braking force Pem set by the second braking control unit 167 may be adopted as the predetermined braking force threshold Pth. In short, the braking force determination unit 165 determines whether the demanded braking force Pdm based on the operation amount of the brake pedal 12 exceeds the emergency braking force Pem set by the second braking control unit 167.

The second braking control unit 167 basically determines whether execution of the emergency braking control is necessary, based on information of the determination result by the collision determination unit 163 as to whether collision of a vehicle occurs. When a determination result indicates a determination that execution of the emergency braking control is necessary, a brake fluid pressure adjustment feature by the VSA system 18 based on emergency braking characteristic (see FIG. 4) used when collision of an own car occurs performs emergency braking control for each wheel.

While performing emergency braking control, the second braking control unit 167 determines whether retreat of the brake pedal 12 is necessary or not, based on a determination result as to whether the demanded braking force Pdm by the braking force determination unit 165 exceeds the emergency braking force Pem, and in the case where the determination result indicates that retreat of the brake pedal 12 is necessary, controls so as to retreat the brake pedal 12 in the press-down direction. Details of the control are described later.

The second braking control unit 167 corresponds to a "braking control unit" according to the present disclosure.

The VSA-ECU 31 includes a microcomputer including CPU, ROM, RAM, and the like. The microcomputer reads out and executes programs and data stored in the ROM, and operates to control execution of various features of the VSA-ECU 31 including a feature acquiring information of the demanded braking force Pdm based on the operation amount of the brake pedal 12, a feature of determining whether collision of the vehicle occurs or not, a feature of determining whether the demanded braking force Pdm based on the operation amount of the brake pedal 12 exceeds the emergency braking force Pem set by the second braking control unit 167, a feature of performing emergency braking control by the VSA system 18 independently from braking operation by the driver when collision of the vehicle occurs, and a feature of retreating the brake pedal 12 in the press-down direction.

[Description of Operation of Vehicle Brake System 10 Based on Flowchart]

Figure 3:
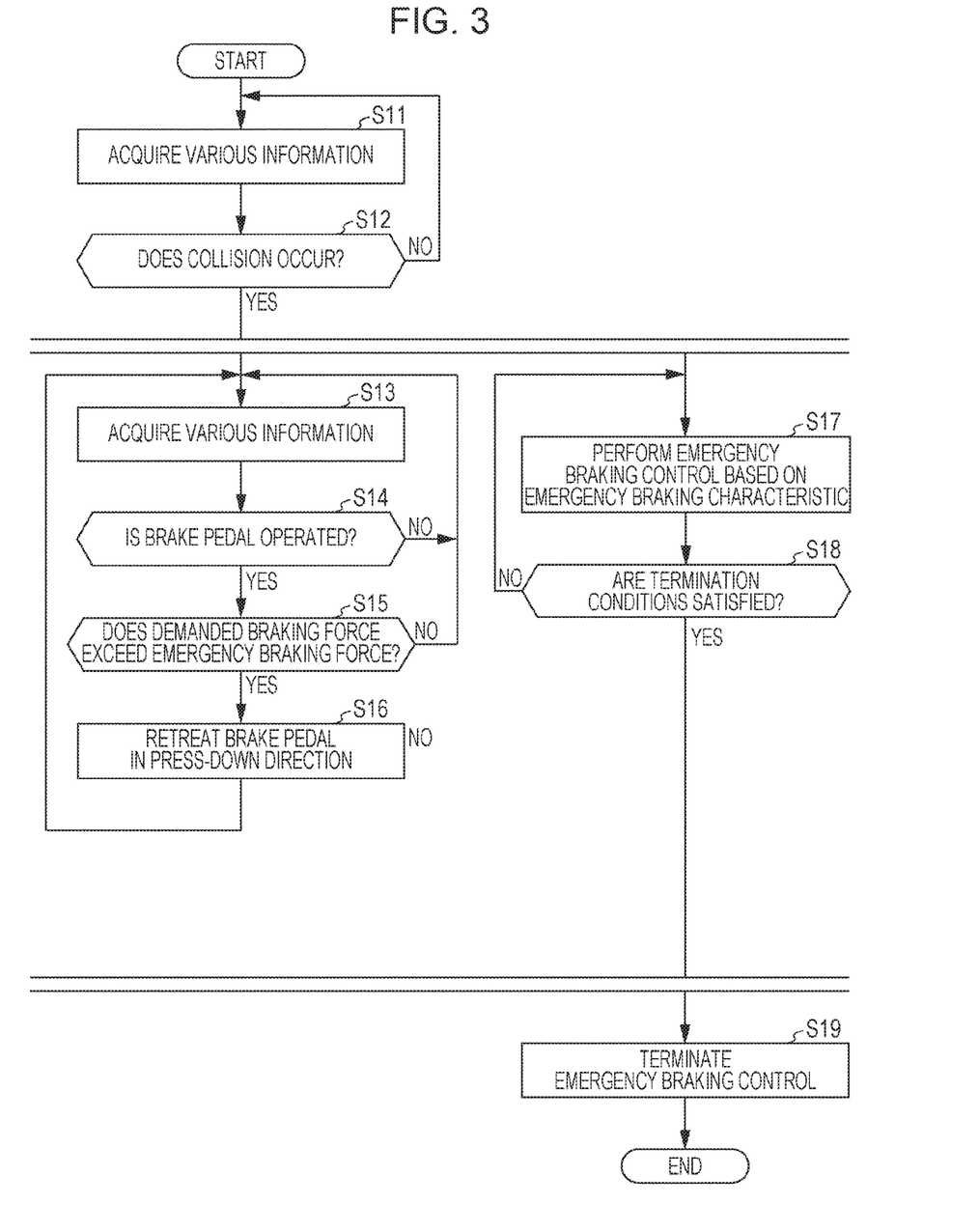
FIG. 3 is a flowchart illustrating the operation of the vehicle brake system.
Figure 4:
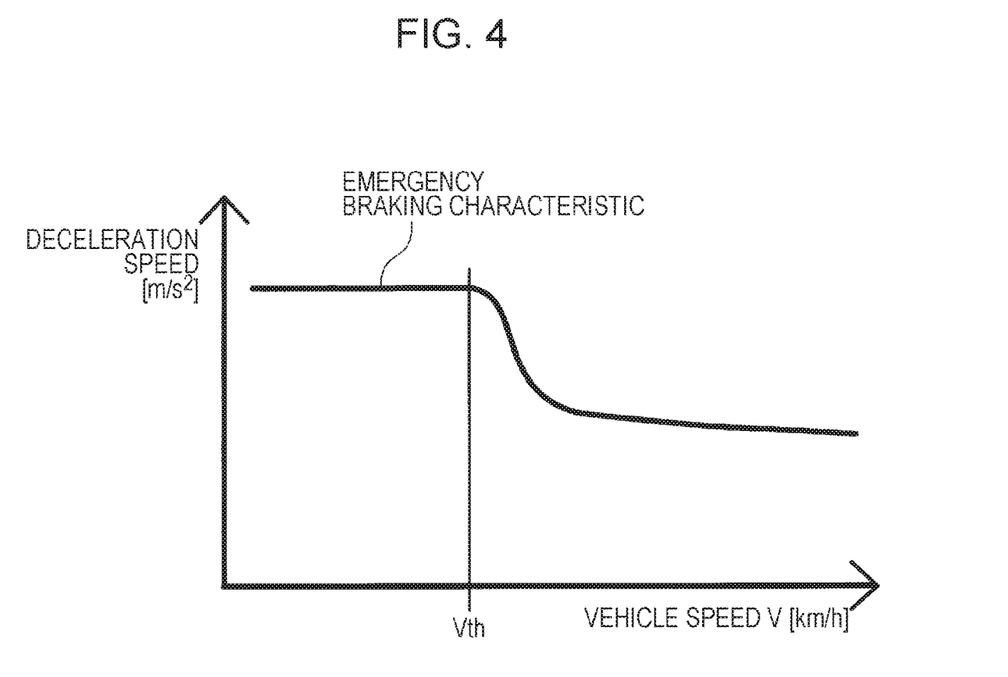
FIG. 4 is an emergency braking characteristic diagram representing emergency braking characteristics used when the vehicle collides.

Next, operation of the vehicle brake system 10 according to the embodiment of the present disclosure is described with reference to FIGS. 3 and 4. FIG. 3 is flowcharts illustrating the operation of the vehicle brake system 10. FIG. 4 is an emergency braking characteristic diagram representing the emergency braking characteristic used when collision of the vehicle occurs.

In step S11 illustrated in FIG. 3, the second information acquisition unit 161 of the VSA-ECU 31 acquires various information including information on the longitudinal G and lateral G generated in a vehicle detected by the G sensor 153 and information OR the vehicle speed detected by the vehicle speed sensor 123.

In step S12, the collision determination unit 163 of the VSA-ECU 31 determines whether collision of the vehicle occurs or not, based on information on the longitudinal G and lateral G acquired in step S11.

When a determination result in step S12 indicates a determination that collision of the vehicle does not occur ("No" in step S12), the VSA-ECU 31 returns the process flow to step S11 and repeats a loop processing of steps S11 to S12 until determined that collision of the vehicle occurs.

Meanwhile, when a determination result in step S12 indicates a determination that collision of the vehicle occurs ("Yes" in step S12), the VSA-ECU 31 proceeds the process flow to a time-divided parallel processing (step S13 and step S17 for emergency braking control). In the time-divided parallel processing, the VSA-ECU 31 appears to concurrently perform a loop processing of steps S13 to S16 (processing of retreating the brake pedal) and a loop processing of steps S17 to S18 (processing of emergency braking control).

In step S13, the second information acquisition unit 161 of the VSA-ECU 31 acquires information on the demanded braking force Pdm based on the operation amount of the brake pedal 12 sent from the ESB-ECU 2S via the CAN communication medium 37.

In step S14, the VSA-ECU 31 determines whether the brake pedal 12 is operated or not based on information on the demanded braking force Pdm acquired in step S13.

When a determination result in step S14 indicates a determination that the brake pedal 12 is not operated ("No" in step S14), the VSA-ECU 31 returns the process flow to step S13 and repeats a loop processing of steps S13 to S14 until that the brake pedal 12 is determined as operated.

Meanwhile, when a determination result in step S14 indicates a determination that the brake pedal 12 is operated ("Yes" in step S14), the VSA-ECU 31 proceeds the process flow to a next step S15.

In step S15, the braking force determination unit 165 of the VSA-ECU 31 determines whether the demanded braking force Pdm based on the operation amount of the brake pedal 12 acquired in step S13 exceeds the emergency braking force Pem set by the second braking control unit.

When a determination result in step S15 indicates a determination that the demanded braking force Pdm does not exceed the emergency braking force Pem ("No" in step S15), the VSA-ECU 31 returns the process flow to step S13 and repeats a loop processing of steps S13 to S15 until it is determined that the brake pedal 12 is operated and the demanded braking force Pdm exceeds the emergency braking force Pem.

Meanwhile, when a determination result in step S15 indicates a determination that the demanded braking force Pdm exceeds the emergency braking force Pem ("Yes" in step S15), the VSA-ECU 31 proceeds the process flow to a next step S16.

In step S16, the second braking control unit 167 of the VSA-ECU 31 performs control of retreating the brake pedal 12 in the press-down direction. Here, the control of retreating the brake pedal 12 in the press-down direction is, for example, the following control.

That is, examples of the control of retreating the brake pedal 12 in the press-down direction include a first control of opening the first and second master cut valves 60a, 60b and thereby allowing a flow of the brake fluid between the master cylinder 34 and the slave cylinder 35, a second control of opening the stroke simulator valve 62 and thereby allowing a flow of the brake fluid between the master cylinder 34 and the stroke simulator 64, and a third control of driving the pressure pump 136 using the pump motor 135 and thereby supplying the brake fluid pressurized by the pressure pump 136 to the regulator valve 116, the first in-valve 120 and the second in-valve 124 respectively.

As a control of retreating the brake pedal 12 in the press-down direction, the second braking control unit 167 of the VSA-ECU 31 performs one or combined control as desired. In practice, the second braking control unit 167 of the VSA-ECU 31 performs all of the first to third controls mentioned above.

Meanwhile, in step S17, the second braking control unit 167 of the VSA-ECU 31 causes the brake fluid pressure adjustment feature by the VSA system 18 based on emergency braking characteristic (see FIG. 4) used when the vehicle has collided to perform emergency braking control for each wheel. Here, the emergency braking characteristic diagram illustrated in FIG. 4 indicates a characteristic of maintaining a predetermined deceleration irrespective of a vehicle speed at the time of collision in a vehicle speed region lower than the vehicle speed threshold Vth, and a characteristic represented by the relation of a recommended deceleration speed corresponding to a change of the vehicle speed V in a vehicle speed region higher than the vehicle speed threshold Vth.

"Emergency braking control of the vehicle based on emergency brake demand" according to the present disclosure is synonymous with emergency braking control of the vehicle based on the emergency braking characteristic (see FIG. 4).

In step S18, the VSA-ECU 31 determines whether termination conditions for the emergency braking control are satisfied. Here, the termination conditions for emergency braking control may be, for example, elapse of a predetermined period of time from the time of stoppage (with the vehicle speed of 0 km/h) and collision of the vehicle (or at the time when emergency braking control has started). This is because it is presumed that termination of the emergency braking control has no problem once the termination condition has been satisfied.

When a determination result in step S18 indicates a determination that termination conditions for emergency braking control are not satisfied (the vehicle is not stopped or a predetermined period of time has not elapsed since the time of collision) ("No" in step S18), the VSA-ECU 31 returns the process flow to step S17 and repeats the processing for emergency braking control of step S17 until determined that termination conditions for emergency braking control are satisfied.

Meanwhile, when a determination result in step 18 indicates a determination that, termination conditions for emergency braking control are satisfied (the vehicle is stopped and a predetermined period of time has elapsed since the time of collision) ("Yes" in step S18), the VSA-ECU 31 proceeds the process flow to nest step S19.

In step S19, VSA-ECU 31 causes to end the processing for the emergency braking control and then end the flow of a series of processings.

[Advantageous Effects of Vehicle Brake System 10 According to Embodiments of Present Disclosure]

Next, advantageous effects of the vehicle brake system 10 according to the embodiments of the present disclosure are described.

The vehicle brake system 10 according to the first, aspect (corresponding to claim 1) includes a second information acquisition unit (demanded braking force acquisition unit) 161 configured to acquire a demanded braking force based on a press-down operation of the brake pedal 12, a collision determination unit 163 configured to determine whether collision of the vehicle occurs or not, a second braking control unit (braking control unit) 167 configured to, when the collision determination unit 163 determines that collision of the vehicle occurs, causes at least any one of the ESB system (first brake fluid pressure generator) 16 and the VSA system (second brake fluid pressure generator) 18 to perform emergency braking control of the vehicle based on an emergency braking demand irrespective of the press-down operation by the driver, and a braking force determination unit 165 configured to determine whether the demanded braking force pdm acquired by the second information acquisition unit 161 exceeds a predetermined braking force threshold Pth.

In the vehicle brake system 10 according to the first aspect, in the case where the vehicle encounters a collision accident, and where a press-down operation exceeding a predetermined braking force threshold is performed, a reaction force transmitted to driver's foot through the brake pedal 12 tends to increase.

In view of this, in the case where the collision determination unit 163 determines that collision of the vehicle occurs, and where the braking force determination unit 165 determines that the demanded braking force Pdm based on the press-down operation exceeds a predetermined braking force threshold Pth, the vehicle brake system 10 according to the first aspect causes the second braking control unit 167 to retreat the operation position of the brake pedal 12 based on the demanded braking force Pdm in the press-down direction compared with an operation position of the brake pedal 12 based on a braking force equivalent to the demanded braking force Pdm when collision of the vehicle does not occur.

In the case where the vehicle encounters a collision accident, and where the press-down operation exceeding a predetermined braking force threshold Pth is performed, the vehicle brake system 10 according to the first aspect reduces a collision impact that a brake pedal 12 gives to the driver while securing an emergency braking force by emergency braking control and without giving an uncomfortable feeling involved in the press-down operation by the driver.

The vehicle brake system 10 according to the second aspect (corresponding to claim 2) includes a second information acquisition unit (demanded braking force acquisition unit) 161 configured to acquire a demanded braking force based on a press-down operation of the brake pedal 12, a collision determination unit 163 configured to determine whether collision of the vehicle occurs or not, a second braking control unit (braking control unit) 167 configured to, when the collision determination unit 163 determines that collision of the vehicle occurs, causes at least any one of the ESB system (first brake fluid pressure generator) 16 and the VSA system (second brake fluid pressure generator) 18 to perform emergency braking control of the vehicle based on an emergency braking demand irrespective of a press-down operation by the driver, and a braking force determination unit 165 configured to determine whether the demanded braking force Pdm acquired by the second information acquisition unit 161 exceeds an emergency braking force Pem by the second braking control unit 167.

In the vehicle brake system 10 according to the second aspect of the present disclosure, in the case where the vehicle encounters a collision accident, and where a strong press-down operation exceeding an emergency braking force Pent by the second braking control unit 167 is performed, a reaction force transmitted to driver's foot through the brake pedal 12 tends to increase.

In view of this, in the case where the collision determination unit 163 determines that collision of the vehicle occurs, and where the braking force determination unit 165 determines that the demanded braking force Pdm based on a press-down operation of the brake pedal 12 exceeds an emergency braking force Pem by the second braking control unit 167, the vehicle brake system 10 according to the second aspect causes the second braking control unit 167 to retreat the operation position of the brake pedal 12 based on the demanded braking force Pdm in the press-down direction compared with an operation position of the pedal 12 based on a braking force equivalent to the demanded braking force Flm when collision of the vehicle does not occur.

In the case where the vehicle encounters a collision accident, and where a strong press-down operation causing the demanded braking force Pdm to exceed an emergency braking force Pem by the second braking control unit 167 is performed, the vehicle brake system 10 according to the second aspect reduces a collision impact that the brake pedal 12 gives to the driver while securing an emergency braking force by emergency braking control and without giving an uncomfortable feeling involved in a press-down operation by the driver.

Meanwhile, in general, the VSA system (second brake fluid pressure generator) 18 has more excellent follow-up performance of the brake fluid pressure with respect to a target brake fluid pressure than the ESB system (first brake fluid pressure generator) 16.

In view of this, the vehicle brake system 10 according to the third aspect (corresponding to claim 3) has a configuration in which in the case where the collision determination unit 163 determines that collision of the vehicle occurs, the second braking control unit (braking control unit) 167 causes the VSA system (second brake fluid pressure generator) 18 to perform emergency braking control of the vehicle based on an emergency braking demand and thereby retreats the operation position of the brake pedal 12 in the press-down direction.

Compared with a vehicle brake system 10 according to the first or second aspect, the vehicle brake system 10 according to the third aspect reduces a collision impact that a brake pedal gives to the driver while securing an emergency braking force by emergency braking control having excellent follow-up performance of the brake fluid pressure with respect to a target brake fluid pressure and without giving an uncomfortable feeling involved in a press-down operation by the driver.

A vehicle brake system 10 according to a fourth aspect (corresponding to claim 4) further includes a master cylinder 34 configured to generate brake fluid pressure corresponding to a press-down operation by the driver, master cut valves 60a, 60b provided respectively inside piping tubes (first fluid paths) 22a, 22d communicating and coupling the master cylinder 34 and the ESB system (first brake fluid pressure generator) 16 and configured to open and close the first fluid paths 22a, 22d, a stroke simulator 64 communicated and coupled with the master cylinder 34 and configured to produce a pseudo reaction force against a press-down operation of a brake pedal 12 by the driver, and a stroke simulator valve 62 provided inside a branch pipeline (second fluid path) 22g communicating and coupling the master cylinder 34 and the stroke simulator 64 with each other.

The problem is how brake fluid pressure generated in the master cylinder 34 is released to members communicated with the master cylinder 34 when the operation position of the brake pedal 12 is retreated in the press-down direction.

In view of this, the vehicle brake system 10 according to the fourth aspect has a configuration, in which, in the case where the collision determination unit 163 determines that collision of the vehicle occurs, the second braking control unit (braking control unit) 167 is caused to open the master cut valves 60a, 60b and the stroke simulator valve 62 and thereby retreat the operation position of the brake pedal 12 in the press-down direction.

The vehicle brake system 10 according to the fourth aspect provides an effect of retreating the operation position of the brake pedal 12 in the press-down direction more quickly and greatly than in the vehicle brake systems 10 according to the first to third aspects, while securing an emergency braking force by emergency braking control.

[Other Embodiment]

Several embodiments described above are examples embodying the present disclosure. Therefore, it should be understood that the technical scope of the present disclosure is not limited to the embodiments. The present disclosure may be implemented in various ways without deviating from the spirit and main features thereof.

For example, control of retreating the brake pedal 12 in the press-down direction according to the embodiments of the present disclosure is described by using examples including a first control of releasing first and second master cut valves 60a, 60b and thereby allowing a flow of the brake fluid between the master cylinder 34 and the slave cylinder 35, a second control of releasing the stroke simulator valve 62 and thereby allowing a flow of the brake fluid between the master cylinder 34 and the stroke simulator 64, and a third control of driving the pressure pump 136 using the pump motor 135 and thereby supplying the brake fluid pressurized by the pressure pump 136 to the regulator valve 116, the first in-valve 120 and the second in-valve 124 respectively. However, the present disclosure is not limited thereto. As far as the brake pedal 12 may be retreated in the press-down direction, any control other than the first to third controls is included in the technical range of the present disclosure.

Finally, an embodiment according to the present disclosure is described by using an example where the VSA-ECU 31 proceeds the process flow to the time division parallel processing (retreat processing of the brake pedal 12 and processing of emergency braking control) when determined that collision of a vehicle occurs. However, the present disclosure is not limited thereto. A VSA-ECU 31 having multiple CPUs operating in coordination with each other may be used and configured to cause each of the multiple CPUs to perform retreat processing of the brake pedal 12 and processing of the emergency braking control.

What is claimed is:

1. A vehicle brake system for braking an own vehicle, the vehicle brake system comprising:
   a brake pedal configured to be pressed down in a press-down operation by a driver in braking the vehicle;
   a brake fluid pressure generator configured to generate brake fluid pressure in response to a brake demand including the press-down operation;
   a demanded braking force acquisition unit configured to acquire a demanded braking force based on the press-down operation;
   a collision determination unit configured to determine whether collision of the vehicle occurs or not;
   a braking controller configured to, when the collision determination unit determines that collision of the vehicle occurs, cause the brake fluid pressure generator to perform emergency braking control of the vehicle based on an emergency braking demand irrespective of the press-down operation by the driver; and a braking force determination unit configured to determine whether the demanded braking force acquired by the demanded braking force acquisition unit exceeds a predetermined braking force threshold, wherein, in a case where the collision determination unit determines that collision of the vehicle occurs and where the braking force determination unit determines that the demanded braking force exceeds the braking force threshold, the braking controller shifts an operation position of the brake pedal corresponding to the demanded braking force to a press-down position located further in a press-down direction of the brake pedal than the operation position of the brake pedal corresponding to a braking force equivalent to the demanded braking force when collision of the vehicle does not occur, wherein the brake fluid pressure generator comprises:
a first brake fluid pressure generator including a first actuator configured to be driven depending on the press-down operation, the first brake fluid pressure generator configured to generate brake fluid pressure by driving the first actuator; and
a second brake fluid pressure generator including a second actuator configured to be driven depending on brake demand, the second brake fluid pressure generator configured to generate brake fluid pressure by driving the second actuator, and when the collision determination unit determines that collision of the vehicle occurs, the braking controller causes the second brake fluid pressure generator to perform the emergency braking control of the vehicle based on the emergency braking demand so as to shift the operation position of the brake pedal to the press-down position.

2. The vehicle brake system according to claim 1, further comprising:
a master cylinder configured to generate brake fluid pressure in accordance with the press-down operation by the driver;
a master cut valve provided inside a first fluid path communicating and coupling the master cylinder and the first brake fluid pressure generator with each other, the master cut valve configured to open and close the first fluid path;
a stroke simulator communicated and coupled with the master cylinder and configured to produce a reaction force against the press-down operation of the brake pedal by the driver; and
a stroke simulator valve provided inside a second fluid path communicating and coupling the master cylinder and the stroke simulator with each other, the stroke simulator valve configured to open and close the second fluid path, wherein
when the collision determination unit determines that collision of the vehicle occurs, the braking controller opens the master cut valve and the stroke simulator valve so as to shift the operation position of the brake pedal to the press-down position.

3. The vehicle brake system according to claim 1 wherein the demanded braking force is acquired using an operation amount of the brake pedal.

4. The vehicle brake system according to claim 1 wherein the demanded braking force is correlated with the operation position of the brake pedal.

5. The vehicle brake system according to claim 1 wherein the second brake fluid pressure generator has better follow-up performance of the brake fluid pressure with respect to a target brake fluid pressure than the first brake fluid pressure generator.

6. A vehicle comprising the vehicle brake system according to claim 1.

7. A vehicle brake system for braking an own vehicle, the vehicle brake system comprising:
a brake pedal configured to be pressed down in a press-down operation by a driver in braking the vehicle;
a brake fluid pressure generator configured to generate brake fluid pressure in response to a brake demand including the press-down operation;
a demanded braking force acquisition unit configured to acquire a demanded braking force based on the press-down operation;
a collision determination unit configured to determine whether collision of the vehicle occurs or not;
a braking controller configured to, when the collision determination unit determines that collision of the vehicle occurs, cause the brake fluid pressure generator to perform emergency braking control of the vehicle based on an emergency braking demand, using an emergency braking force determined independently of and irrespective of the press-down operation by the driver; and
a braking force determination unit configured to determine whether the demanded braking force acquired by the demanded braking force acquisition unit exceeds the emergency braking force by the braking controller, wherein
in a case where the collision determination unit determines that collision of the vehicle occurs and where the braking force determination unit determines that the demanded braking force exceeds the emergency braking force by the braking controller, the braking controller shifts an operation position of the brake pedal corresponding to the demanded braking force to a press-down position located further in a press-down direction of the brake pedal than the operation position of the brake pedal corresponding to a braking force equivalent to the demanded braking force when collision of the vehicle does not occur.

8. The vehicle brake system according to claim 7 wherein the demanded braking force is acquired using an operation amount of the brake pedal.

9. The vehicle brake system according to claim 7 wherein the emergency braking control is performed using the emergency braking force.

10. The vehicle brake system according to claim 7 wherein the demanded braking force is correlated with the operation position of the brake pedal.

11. A vehicle brake system for braking an own vehicle, the vehicle brake system comprising:
a brake pedal configured to be pressed down in a press-down operation by a driver in braking the vehicle;
a brake fluid pressure generator configured to generate brake fluid pressure in response to a brake demand including the press-down operation;
a demanded braking force acquisition ECU configured to acquire a demanded braking force based on the press-down operation;
a collision determination ECU configured to determine whether collision of the vehicle occurs or not;
a braking controller configured to, when the collision determination ECU determines that collision of the vehicle occurs, cause the brake fluid pressure generator to perform emergency braking control of the vehicle based on an emergency braking demand irrespective of the press-down operation by the driver; and a braking force determination ECU configured to determine whether the demanded braking force acquired by the demanded braking force acquisition ECU exceeds a predetermined braking force threshold, wherein, in a case where the collision determination ECU determines that collision of the vehicle occurs and where the braking force determination ECU determines that the demanded braking force exceeds the braking force threshold, the braking controller shifts an operation position of the brake pedal corresponding to the demanded braking force to a position located further in a press-down direction of the brake pedal than the operation position of the brake pedal corresponding to a braking force equivalent to the demanded braking force when collision of the vehicle does not occur, wherein
the brake fluid pressure generator comprises:
  a first brake fluid pressure generator including a first actuator configured to be driven depending on the press-down operation, the first brake fluid pressure generator configured to generate brake fluid pressure by driving the first actuator; and
  a second brake fluid pressure generator including a second actuator configured to be driven depending on brake demand, the second brake fluid pressure generator configured to generate brake fluid pressure by driving the second actuator, and
when the collision determination ECU determines that collision of the vehicle occurs, the braking controller causes the second brake fluid pressure generator to perform the emergency braking control of the vehicle based on the emergency braking demand so as to shift the operation position of the brake pedal to the press-down position.

* * * * *